(12) United States Patent
Monnerat

(10) Patent No.: US 7,312,748 B2
(45) Date of Patent: Dec. 25, 2007

(54) METHOD OF FACTORIZING PSEUDODISTANCE TIME OF WEEK IN AN ASSISTED GNSS CONTEXT

(75) Inventor: Michel Monnerat, L'Union (FR)

(73) Assignee: Alcatel, Paris (FR)

( * ) Notice: Subject to any disclaimer, the term of this patent is extended or adjusted under 35 U.S.C. 154(b) by 187 days.

(21) Appl. No.: 11/043,183

(22) Filed: Jan. 27, 2005

(65) Prior Publication Data

US 2005/0174285 A1    Aug. 11, 2005

(30) Foreign Application Priority Data

Jan. 28, 2004   (FR) .................................. 04 50161
Sep. 15, 2004   (FR) .................................. 04 09751

(51) Int. Cl.
 *G01S 5/14*   (2006.01)
(52) U.S. Cl. ................................. 342/357.09
(58) Field of Classification Search ........... 342/357.09, 342/357.1
See application file for complete search history.

(56) References Cited

U.S. PATENT DOCUMENTS 6,408,178 B1   6/2002   Jolley
6,453,237 B1   9/2002   Abraham
6,476,762 B2   11/2002  Valio
6,958,726 B1 * 10/2005  Abraham et al. ...... 342/357.15
2002/0008502 A1  1/2002  Bryant

* cited by examiner

*Primary Examiner*—Thomas H. Tarcza
*Assistant Examiner*—Fred H. Mull
(74) *Attorney, Agent, or Firm*—Sughrue Mion, Pllc.

(57) ABSTRACT

A method is disclosed of calculating the position of a mobile device in which an assistance data server provides aid with solving the point of the mobile device and the mobile device communicates with the server via a cellular network and receives positioning signals from a satellite positioning system using a spread spectrum access technique. The method comprises the following steps: following reception of the positioning signals, the device sends the server a set of spreading code phases corresponding to the satellites acquired, the code phases having a single time of week indication corresponding to the transmission time of one of the code phases; the server deduces from the information the transmission times corresponding to the code phases and the pseudodistances; and the server solves the point.

1 Claim, 2 Drawing Sheets

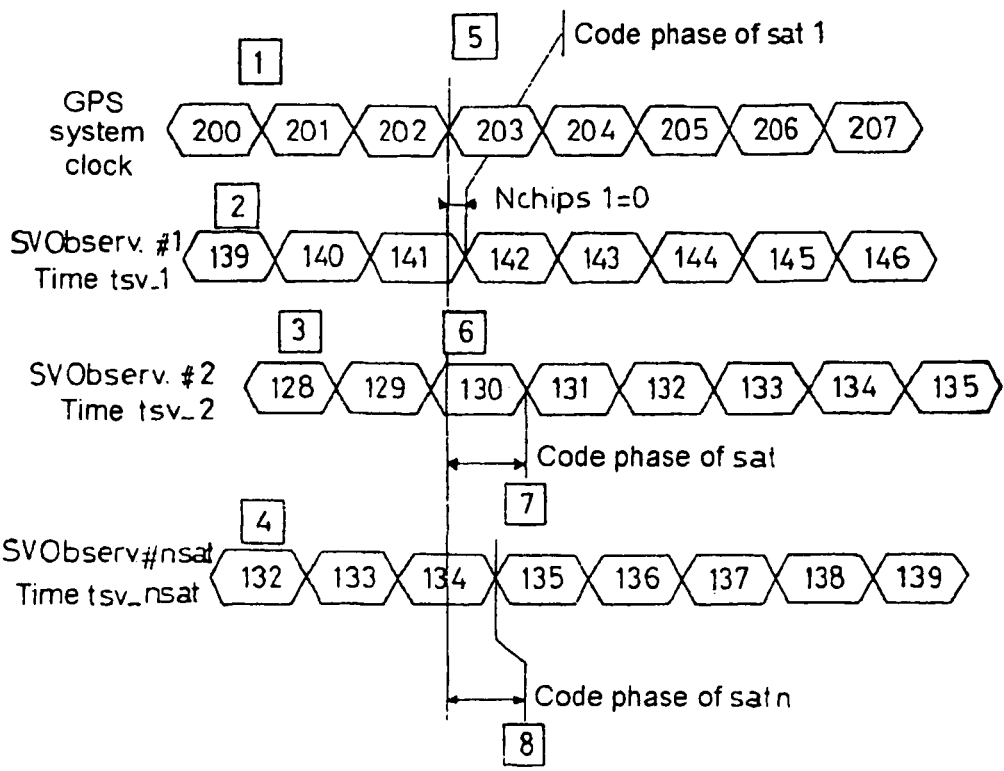
FIG_1 [RELATED ART]
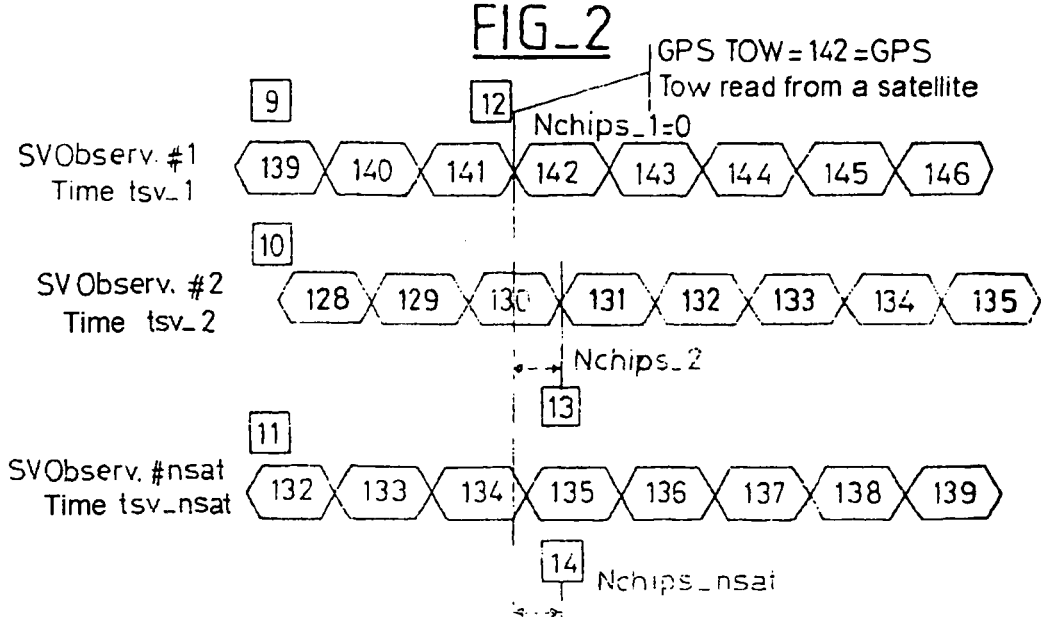
FIG_2

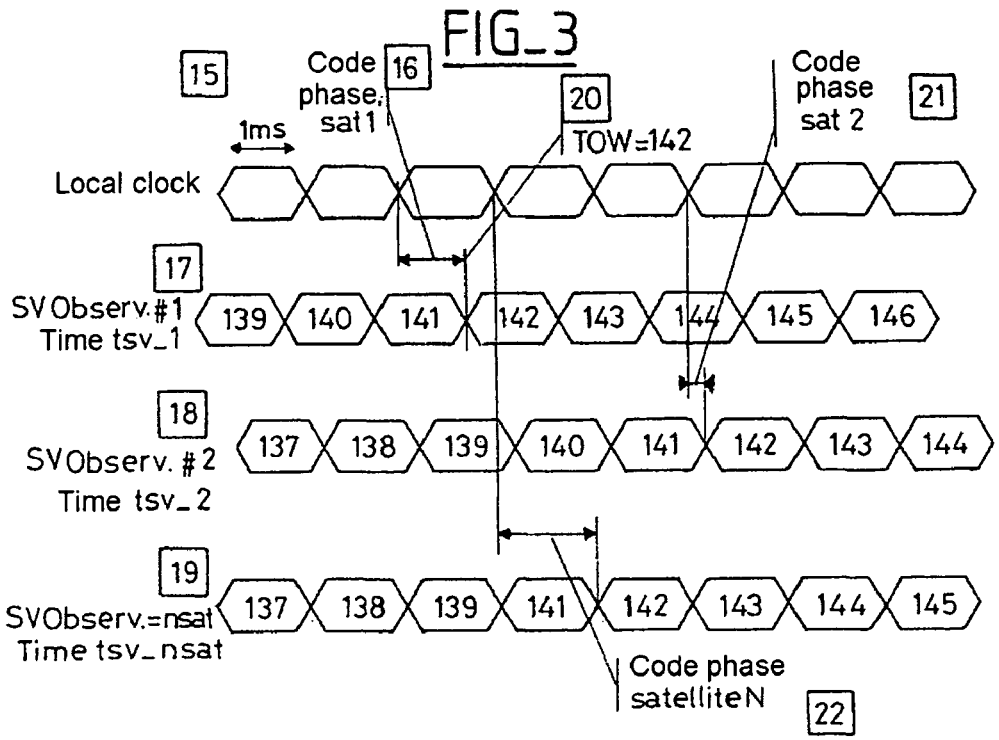
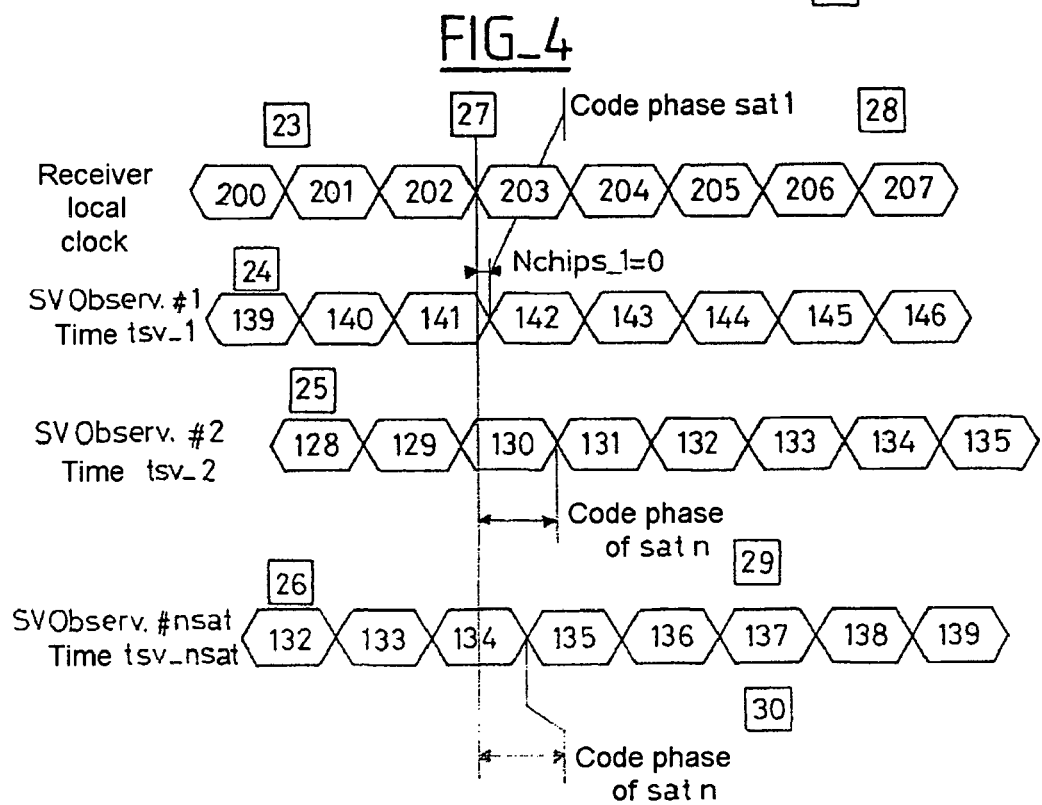

METHOD OF FACTORIZING PSEUDODISTANCE TIME OF WEEK IN AN ASSISTED GNSS CONTEXT

CROSS-REFERENCE TO RELATED APPLICATIONS

This application is based on French Patent Application No. 0409751 filed Sep. 15, 2004, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a method of calculating the position of a mobile device based on:
the known phases of spreading codes of a plurality of visible satellites,
a known accurate or approximate time reference corresponding to the measurement of these code phases, and
reconstituting the pseudodistances from the time reference, an approximate position of the mobile device to be positioned and the code phases.

2. Description of the Prior Art

In the field of mobile telephones, it is increasingly found to be necessary to be able to locate mobile telephone devices.

To this end, it is known in the art to combine, within this type of mobile device, usually comprising a GSM (Global System for Mobile communications) mobile telephone type cellular radio telephone receiver, a GNSS (Global Navigation Satellite System) receiver such as a GPS (Global Positioning System), GLONASS or GALILEO receiver by means of which the mobile device picks up transmissions from satellites to determine its position. In this way, in the event of a traffic accident, for example, or for any other positioning requirement, the mobile device is able to calculate and transmit its position.

The position of a receiver of the above kind may be determined in the following manner: a plurality of satellites transmit continuously a signal that carries a "time of week" (TOW) and is addressed to the receiver. The receiver when synchronized to the clock of the satellites is able to measure the propagation time of the signal and to deduce therefrom a distance between it and a particular satellite. A receiver of this kind is able to determine its position by means of a process of triangulation using three satellites. Each measured propagation time represents the radius of a sphere centered on a particular satellite, the receiver being located on that sphere. With two distance measurements, the position of a receiver is on a circle formed by the intersection of two spheres. A simultaneous third measurement reduces the intersection to two points, one of which is at a great distance and is easy to isolate.

However, the clock of the receiver is affected by a skew $\Delta T$ because it is not totally synchronous with the GPS. The atomic clocks of GPS satellites are very accurate but the accuracy of the more rudimentary GPS receiver is much lower. This clock skew $\Delta T$ is the time difference between the clock of the receiver and the clock of the satellites, and may be as much as several seconds. It is reflected in an error in the measurement of the GPS signal propagation time and thus an error $c.\Delta T$ in the satellite-receiver distances, where c is the velocity of light. This error affects all distances measured by the receiver. Since the distances are imperfect, as they are subject to a time skew, they are referred to as pseudodistances. The time skew, which is unknown a priori, must then be determined.

There is therefore a fourth unknown in three dimensions (because there are three satellites) and it is necessary to measure at least one additional distance, and thus to have access to at least four satellites, in order to solve a system of four equations in four unknowns.

The signal transmitted by each satellite is a phase-modulated pseudorandom signal; the GPS receiver must acquire this signal. The satellite and the receiver both transmit the pseudo random signal at the same time, which is set by the general clock of the GPS system (the receiver generates a replica of this signal). The receiver then delays the start of this transmission until its signal is superposed on that coming from the satellite. This delay is determined by correlating the two signals. The value of this delay is the time taken by the signal to propagate from the satellite to the user. Because the time taken by the signal to travel this distance is of the order of 1/20 second, this type of measurement requires immense accuracy (better than 100 nanoseconds). However, as the clock of the GPS receiver is never totally synchronized to the clock of the satellites, to achieve the maximum correlation of the two signals the receiver has constantly to adjust its clock by a process of successive approximations. The acquisition of the signal therefore necessitates very considerable time scanning by the receiver.

In an Assisted-GPS (Assisted Global Positioning System) context, the position calculation process uses a mobile receiver capable of receiving and processing GNSS signals and of communicating with a cellular network, and an assistance data server responsible for broadcasting data for assisting the processing of GNSS signals in the mobile. An MS-Assisted (Mobile Station Assisted) mode of operation entails the server broadcasting data for assisting with the measurement of pseudodistances using GPS signals, the measured values being forwarded to the server, which calculates the position. The object of this mode of operation is:

to minimize the quantity of assistance data,
to lower the operating threshold of the receiver (in terms of signal to noise ratio), and
to reduce the computation power necessary for processing the GNSS signals.

The basic idea of the Assisted-GPS or Assisted-GNSS mode of operation is:

avoiding the receiver demodulating the ephemerides of the satellites contained in the signals coming from the satellites, which economizes on the time necessary for calculating the first point and the operating threshold, and
supplying the receiver with a prelocation, an idea of the time and the Doppler effect of the satellites, again to accelerate operation.

Nevertheless, in this mode of operation, typically referred to as the MS-Assisted mode, the mobile must send the pseudodistances to the server.

Because the position of the mobile is known a priori to an uncertainty equivalent to the size of the cell, it is possible to send only one item of spreading code phase information to minimize the traffic. Typically, in the context of the GPS SPS (GPS Standard Positioning Service), a spreading code having a period of 1 ms, the mobile sends the server the measured position of the beginning of a spreading code length in a data millisecond generally referenced to the beginning of a GPS system time millisecond. The server then deduces from the system time the position of the satellites at the time of transmission of the signal, thereby enabling the server to triangulate the user's position.

FIG. 1 shows the most immediate mode of operation, aiming to economize on processing by the mobile receiver. It is assumed that the mobile has access to the system time of the navigation system, in this example the GPS system time (reference 1). Various methods may be used to achieve this:

maintaining the time on an accurate local clock, synchronizing to an external source synchronized to the GPS.

This is the case if the receiver is connected to a mobile network synchronized to the GPS.

To position itself, the receiver must measure the distance between itself and each visible satellite. The distance is measured by multiplying by c the difference between the transmission Time Of Week (TOW) and the reception TOW of the signal coming from the satellite. To this end, the satellite signal contains TOW information in a TOW message that has a period of a few seconds, typically 6 seconds in the GPS. The TOW information is relayed with a shorter repetition period by the very structure of the signal and to be more precise by the repetitions of the spreading codes (for conciseness, a spreading code is referred to simply as a code hereinafter). This information is independent of the TOW information contained in the navigation message and is ambiguous because it repeats with a certain period. This structure is represented at 1. In a GPS L1 situation, the spreading codes have a repetition period of 1 ms. They are represented at 2 for a signal received from a first satellite SV Observ. #1 ("Satellite Visible Observed #1"), at 3 for a signal received from a second satellite SV Observ. #2, and at 4 for a signal received from an $n^{th}$ satellite SV Observ. #nsat.

In the assistance situation represented in FIG. 1, i.e. in which the mobile has access to an external synchronization source (GPS clock 1), it is not necessary to solve the position to read the transmission TOW of the TOW signal in the message. It is in fact sufficient to measure the code phase of each satellite, i.e. to measure the time between the beginning of a receive code period expressed as a number of chips (6 to 8) and the millisecond transition on the GPS timescale (1).

Knowing:

a prelocation, and the GPS TOW at which the measurement is effected, it is possible:

to calculate the approximate position of the satellites at the time of transmission of the signal, and to deduce the approximate user-satellite distance, and consequently to resolve the 1 ms ambiguity as to the transmission TOWs.

On completion of the above process, the measured satellite-user distance is known unambiguously.

The quantity of information transmitted is reduced because there is only one time reference for the receiving time.

The above device is particularly attractive when the mobile has access to the GPS system time, typically in an IS95 mobile telephone network synchronized to the GPS. This is not the case in an asynchronous GSM telephone network. In a GSM network, the GPS system time may be obtained by reading the TOW field of the GPS message from the satellites, but this has a number of drawbacks:

it obliges the mobile receiver to demodulate a GPS message, which impacts on the time to calculate the point, and demodulating the data requires a higher power of the received signal than simply detecting the beginning of a code.

Another approach would be to maintain the GPS time in the mobile by means of a local clock, but this presupposes having initial access to the information to reset the local clock. Also, the local clock of the receivers being of limited quality, an error of several tens of ms may affect the TOW, which leads to an error when the server calculates the position of the satellites and consequently to an error in the solution of the user's position.

To this end, the present invention proposes a method for minimizing the complexity of synchronization to the GPS.

A first embodiment of the present invention proposes to mark the code phase measurements relative to the TOW received in a particular GPS signal instead of relative to the GPS system TOW. This has the advantage of minimizing the number of TOWs to be demodulated. To this end, it suffices to identify the code transition TOW from only one received signal, in other words it suffices to demodulate only one received signal. The advantages of this are:

it minimizes the computation load for the mobile, and the required power level for reception from the satellites is much lower than would be required to demodulate all the TOWs.

SUMMARY OF THE INVENTION

The invention therefore provides a method of calculating the position (or point) of a mobile device, the method employing an assistance data server for providing aid with solving the point of the mobile device and the mobile device comprising means for communicating with the server via a cellular mobile telephone network and means for receiving positioning signals from a satellite positioning system using a spread spectrum access technique, the method comprising the following steps:

following reception of the positioning signals, the device sends the server a set of spreading code phases corresponding to the satellites acquired, the code phases having a single time of week indication corresponding to the transmission time of one of the code phases, the server deduces from the information the transmission times corresponding to the code phases and the pseudodistances, and the server solves the point.

The invention also provides a method of calculating the position (or point) of a mobile device, the method employing an assistance data server for providing aid with solving the point of the mobile device and the mobile device comprising means for communicating with the server via a cellular mobile telephone network and means for receiving positioning signals from a satellite positioning system using a spread spectrum access technique, the method comprising the following steps:

the mobile device sends the server a set of code phases corresponding to the acquired satellites, the code phases being measured relative to the start of millisecond slices maintained by a local clock, the code phases having a time of week relative to a transmission time, the server deduces the pseudodistances from the code phases and the associated transmission time, and the server calculates the position of the mobile device.

The invention further provides a method of calculating the position (or point) of a mobile device, the device comprising means for receiving positioning signals coming from a satellite positioning system using a spread spectrum access technique, in which method, to avoid reading the transmission TOW $T_e$ of the positioning signals, a non-linear technique is used to minimize the following function, in which Xu, Yu, Zu represent the position of the mobile device, $\Delta T$ represents the clock error in the pseudodistance measurement, and $T_e$ represents the transmission TOW of the positioning signals:

$$f(X_u, Y_u, Z_u, \Delta T, T_e) = \sum_{ksat=1}^{N_{sat}} \left( \sqrt{(X_s(T_e, k_{sat}) - X_u)^2 + (Y_s(T_e, k_{sat}) - Y_u)^2 + (Z_s(T_e, k_{sat}) - Z_u)^2} - \rho_{ksat} - \Delta T \right)^2$$

In one embodiment of the invention the step of minimizing the function f is based symmetrically on the reception TOW $T_r$ of the positioning signals instead of the transmission TOW $T_e$.

In one embodiment of the invention the step of minimizing the function f is carried out by calculation means of the mobile device.

In one embodiment of the invention the method uses an assistance data server for providing aid with solving the point of the mobile device and the mobile device comprising means for communicating with the server via a cellular mobile telephone network, the minimization step of the method is executed by calculation means of the server.

The invention and the advantages that derive from it will become more clearly apparent on reading the following description with reference to the appended drawings of preferred embodiments of the invention provided by way of nonlimiting example only.

BRIEF DESCRIPTION OF THE DRAWINGS

FIG. 1, already described, relates to the standard TOW of code phases.

FIG. 2 relates to one way of coding information sent from a mobile to a server.

FIGS. 3 and 4 relate to measurements of the TOW field with identical transmissions from all satellites.

DETAILED DESCRIPTION OF THE PREFERRED EMBODIMENTS

FIG. 2 shows a first embodiment of a method of the invention. A first signal coming from a first satellite is acquired at 9. The TOW is demodulated to obtain the time of week of the code phases of this first signal 12, from which a time reference is deduced. The code phases of the other received signals are then measured relative to this time reference (13, 14).

The method uses the following elements:
at least one radio navigation satellite,
at least one mobile device,
at least one assistance server for improved acquisition of satellite data by the mobile device, and the processing comprises the following steps:

reception of the satellite data by the mobile device,
estimation by the mobile device of the code phases of the GPS signals (or by extension of the GNSS signals),
determination of the TOW of the code phases from the transmission time relative to one of the satellites, typically the strongest visible satellite,
transmission of said code phases and the TOW to the server, and
estimation by the server of the pseudodistances associated with each code phase.

Said estimation method is also characterized in that the server deduces from the known position of the mobile obtained from information from the network, for example the position of the basic cell, a transmission TOW for the code phases to which the TOW transmitted in the assistance message is not relevant.

In more concrete terms, in the FIG. 2 example, the TOW pivot is the satellite 1. The message sent to the server then comprises:

---

TOW: transmission time extracted from the satellite 1 message in the following list, TOW being an integer number of ms
Satellite 1 phase code = 0
Satellite 2 phase code, taking as the origin the transition of the satellite 1 code, from 0 to 1024 chips

.
.

Satellite n phase code, taking as the origin the transition of the satellite 1 code, from 0 to 1024 chips

---

The server knows the ephemerides of the satellites and carries out the following steps of the computation process:
it calculates the positions of the satellites at the TOW referred to in the message coming from the mobile,
it calculates the distances $d_{TOW}$ ($k_{sat}$, MS) between the satellite $k_{sat}$ and the a priori position of the mobile (the approximate position obtained from the information on the cell) at the TOW,
it estimates the transmission time $t_{TOW}$ ($k_{sat}$, MS)=$d_{TOW}$ ($k_{sat}$, MS)/c, where c is the velocity of light,
it applies various corrections: $\tilde{t}_{TOW}$ ($k_{sat}$, MS)=$t_{TOW}$ ($k_{sat}$, MS)−$\Delta b_{Ksat}$−$\Delta I_{ksat}$, where $\Delta b_{Ksat}$ corresponds to the clock correction of the satellite ksat and $\Delta I$ corresponds to the sum of the ionospheric and tropospheric corrections,
it estimates the transmission time of each code phase addressed in the list $T_{Send}$ (k_sat)=TOW−E[$\tilde{t}_{TOW}$ ($k_{sat}$, MS)−$\tilde{t}_{TOW}$ (1, MS)], in which E[.]designates the integer part,
it resolves ambiguity:

$$\text{if } \text{Frac}[\tilde{t}_{TOW}(k_{sat}, MS) - \tilde{t}_{TOW}(1, MS)] - \frac{[\text{code\_phase}(k_{sat}) - \text{code\_phase}(1)]}{Rc} > \frac{100}{Rc},$$

where Rc is the chip rate (1.023 Mchip/s in the case of the GPS), in which case $T_{send}$ (k_sat)=$T_{send}$ (k_sat)−1 ms, it estimates the pseudodistances:

$$\rho(\text{k\_sat}) = \left[ \frac{\text{code\_phase}(k_{sat})}{Rc} + E[\tilde{t}_{TOW}(k_{sat}, \text{MS}) - \tilde{t}_{TOW}(1, \text{MS})]^* 10^{-3} \right]^* c$$

it effects the standard solution of the position of the mobile by solving the following system:

$\|\text{Pos\_sat}(k_{sat}, T_{Send} \text{ (ksat)}) - \text{Pos\_MS}\| = \rho(\text{k\_sat}) + c\Delta\text{Clock}$, where ΔClock is the clock unknown.

Thanks to the invention, in an asynchronous GSM network, it is possible for the assistance data server in the MS-Assisted mode to solve the position of the mobile without error and by transmitting in the mobile to server direction only one time reference (a number of ms) and one set of code phases.

The device advantageously exploits the fact that the server knows the ephemerides of the satellites and the approximate position of the mobile, so that the mobile does not need to know this information at any time.

The present invention may also be implemented in a slightly different manner by transferring to the server a measurement of code phases relative to the start of a millisecond slice as maintained on a local clock. The TOW field designates the transmission time of the start of each code period over which the measurement is carried out, as shown in FIG. 3. The local clock 15 of the receiver serves as a time reference. The code periods of each visible satellite (SV) are shown (17 to 19). The GPS receiver measures the code phases of the code periods transmitted synchronously by each satellite. Thus the measurement sent by the receiver to the mobile corresponds to the transmission TOW (for example 142 ms at 20 in FIG. 3) and the times elapsed between the start of each period and the local clock millisecond transition, referenced 16 for the satellite 1, 21 for the satellite 2, and 22 for the satellite N, respectively.

The point is then solved naturally because the code period starts all correspond to the same transmission time, although they are naturally not received at the same time. Using a calculation similar to the preceding calculation, the server estimates the difference (expressed as a number of milliseconds) to be added to each code phase to deduce the pseudodistances.

A second embodiment is proposed hereinafter that aims to reduce the requirement for demodulation of the signal transmission time information and consequently to limit the processing carried out in the receiver. FIG. 4 shows this mode of operation. Clock information is used by the receiver 23 but is not necessarily synchronous with the GPS. The receiver measures the code phases of the visible satellites relative to a millisecond slice of the synchronization information 28 to 30 for the satellites 1 to N, respectively. The following information is deduced from these measurements:

TOW: reception TOW measured on an internal clock
Satellite 1 phase code, taking as the origin the millisecond transition of the internal clock reference of the receiver, from 0 to 1024 chips
Satellite 2 phase code, taking as the origin the millisecond transition of the internal clock reference of the receiver, from 0 to 1024 chips

.
.
.

Satellite n phase code, taking as the origin the millisecond transition of the internal clock reference of the receiver, from 0 to 1024 chips The pseudodistances are then calculated in the same way as in the first embodiment.

It is known in the art that the user position is solved by solving the following system:

$d(\text{User, Satellite}_1 (T_E)) = \rho_1 + c\Delta T$ $d(\text{User, Satellite}_2 (T_E)) = \rho_2 + c\Delta T$ $d(\text{User, Satellite}_{Nsat} (T_E)) = \rho_{Nsat} + c\Delta T$ in which d(x,y) is the distance between x and y, $\rho_k$ is the pseudodistance between the visible satellite k and the user, ΔT is the pseudodistance measurement clock error.

Conventionally, the transmission TOW $T_e$ is known perfectly from reading the satellite signal. The system of equations is then conventionally linearized to yield a linear system:

$$\begin{bmatrix} \frac{X_s(T_e, 1) - X_u}{d(T_e, 1)} & \frac{Y_s(T_e, 1) - Y_u}{d(T_e, 1)} & \frac{Z_s(T_e, 1) - Z_u}{d(T_e, 1)} & 1 \\ \frac{X_s(T_e, \text{N\_sat}) - X_u}{d(T_e, \text{N\_sat})} & \frac{Y_s(T_e, \text{N\_sat}) - Y_u}{d(T_e, \text{N\_sat})} & \frac{Z_s(T_e, \text{N\_sat}) - Z_u}{d(T_e, \text{N\_sat})} & 1 \end{bmatrix}$$

$$\begin{bmatrix} \delta X_u \\ \delta Y_u \\ \delta Z_u \\ \Delta T \end{bmatrix} = \begin{bmatrix} \rho_1 - d(T_e, 1) \\ \cdots \\ \rho_{Nsat} - d(T_e, N_{sat}) \end{bmatrix}$$

in which $d(T_e, k_{sat}) = \sqrt{(X_s(T_e) - X_u)^2 + (Y_s(T_e) - Y_u)^2 + (Z_s(T_e) - Z_u)^2}$ In the present instance, the mobile does not read the transmission TOW in the satellite signal. The transmission TOW therefore becomes an unknown.

The present invention therefore also proposes a method for solving the transmission TOW as a further unknown. The problem therefore comprises five unknowns: ($X_u$, $Y_u$, $Z_u$, ΔT, $T_e$). To solve the problem, it is proposed to minimize the following function:

$$f(X_u, Y_u, Z_u, \Delta T, T_e) = \sum_{ksat=1}^{N_{sat}} \left( \begin{array}{c} \sqrt{(X_s(T_e, k_{sat}) - X_u)^2 + (Y_s(T_e, k_{sat}) - Y_u)^2 + (Z_s(T_e, k_{sat}) - Z_u)^2} \\ -\rho_{ksat} - \Delta T \end{array} \right)^2$$

The minimization techniques used are non-linear prior art techniques of the Newton or other type.

In another embodiment, and symmetrically, the step of minimizing said function f is based on the reception TOW $T_r$ of the positioning signals instead of the transmission TOW $T_e$.

This technique may be used either by the calculation means of the mobile or by the calculation means of the server.

Another embodiment of the method minimizes the function $f(.)$ by linearizing the problem. It is then necessary to solve the following system of linear equations:

For a given transmission TOW $T_e$, $$\begin{bmatrix} \vdots & \vdots & \vdots & \vdots \\ \frac{X_s(T_e, k_{sat}) - X_u}{d_{ksat}} & \frac{Y_s(T_e, k_{sat}) - Y_u}{d_{ksat}} & \frac{Z_s(T_e, k_{sat}) - Z_u}{d_{ksat}} & 1 \\ \vdots & \vdots & \vdots & \vdots \end{bmatrix}$$

$$\begin{bmatrix} \delta X_u \\ \delta Y_u \\ \delta Z_u \\ \delta \Delta T \end{bmatrix} = \begin{bmatrix} \vdots \\ \rho_{ksat} - d_{ksat} \\ \vdots \end{bmatrix}$$

which may be written in the form:
A.δX=B, where $$A = \begin{bmatrix} \vdots & \vdots & \vdots & \vdots \\ \frac{X_s(T_e, k_{sat}) - X_u}{d_{ksat}} & \frac{Y_s(T_e, k_{sat}) - Y_u}{d_{ksat}} & \frac{Z_s(T_e, k_{sat}) - Z_u}{d_{ksat}} & 1 \\ \vdots & \vdots & \vdots & \vdots \end{bmatrix},$$

matrix of four columns and ksat rows $$B = \begin{bmatrix} \vdots \\ \rho_{ksat} - d_{ksat} \\ \vdots \end{bmatrix},$$

vector of one column and ksat rows $$\delta X = \begin{bmatrix} \delta X_u \\ \delta Y_u \\ \delta Z_u \\ \delta \Delta T \end{bmatrix},$$

vector of one column and ksat rows.

The solution of the above system is given by $\delta X = ({}^tAA)^{-1}{}^t AB$ where ${}^tA$ designates the transposed matrix of A.

The solution algorithm is then as follows:

-if $\sqrt{\delta X_u^2 + \delta Y_u^2 + \delta Z_u^2} \geq \alpha$

-$\delta X = ({}^tAA)^{-1}{}^t AB$ $$-\begin{bmatrix} X_u \\ Y_u \\ Z_u \\ \Delta T \end{bmatrix} = \begin{bmatrix} X_u \\ Y_u \\ Z_u \\ \Delta T \end{bmatrix} + \begin{bmatrix} \delta X_u \\ \delta Y_u \\ \delta Z_u \\ \delta \Delta T \end{bmatrix}$$

update matrix A
endif

When the above algorithm terminates, it is then necessary to compute a metric corresponding to an estimation residue:

$g(T_e) = \|A(T_e)\delta X - B\|^2$

The TOW Te being approximate and treated as an unknown, the solution to the problem corresponds to the solution obtained with a hypothesis for $T_e$, that minimizes the criterion $g(T_e)$. The solution of the complete problem, i.e., the problem in five unknowns ($X_u$, $Y_u$, $Z_u$, $\Delta T$, $T_e$), corresponds to minimizing the function $g(T_e)$. One way to solve this problem is to discretize the computation of the metric, i.e. to compute the criterion $g(.)$ for the following values of $T_e$:

$T_k = T_{e0} + k\delta T_e$, where k is an integer varying from 0 to N,
$\delta T_e$, a quantizing step,
$T_{e0}$ a lower limit of the value of $T_e$
the user position is then that for which $g(T_k)$ is minimum for k varying from 0 to N.

It will further be noted that the description of the invention has emphasized the various steps of the method of the invention, although it is clear that the various elements used in that method comprise the means necessary for implementing the invention, and that the mobile and the server comprise, in addition to the calculation means cited above, communication means for the exchange of signals between the mobile and the server and reception means for positioning signals (GPS, GNSS, etc), respectively. Furthermore, the mobile comprises means for sending code phases and the server comprises means for receiving said code phases.

In particular, the invention has been described in the context of a system of the GPS type, but the system could be another system of the GNSS type, such as a system of the GLONASS or GALILEO type.

There is claimed:

1. A method of calculating a position of a mobile device, said method employing an assistance data server for providing aid with solving the position of said mobile device and said mobile device comprising means for communicating with the server via a cellular mobile telephone network and means for receiving positioning signals from a satellite positioning system using a spread spectrum access technique, said method comprising:

following reception of said positioning signals, sending from the mobile device to said server a set of spreading code phases corresponding to the satellites acquired, said set of spreading code phases having a single time of week indication corresponding to the transmission time of one of the code phases, determining, from said code phases, transmission times corresponding to said code phases and pseudodistances at said server, and determining said position at said server.

* * * * *